G. J. DICKSON.

ICE TONGS.

No. 10,548. Reissued Jan. 6, 1885.

Witnesses:

S. B. Brewer

C. W. Franklin

Inventor:

Gilbert J. Dickson by William H. Lowe

Attorney

UNITED STATES PATENT OFFICE.

GILBERT J. DICKSON, OF ALBANY, NEW YORK.

ICE-TONGS.

SPECIFICATION forming part of Reissued Letters Patent No. 10,548, dated January 6, 1885.

Original No. 287,423, dated October 30, 1883. Application for reissue filed October 24, 1884.

*To all whom it may concern:*

Be it known that I, GILBERT J. DICKSON, of the city and county of Albany, and State of New York, have invented a new and useful Improvement in Ice-Tongs, of which the following is a specification, reference being had to the accompanying drawings, making a part thereof.

My invention relates more particularly to ice-tongs manufactured from wire, the object of my improvement being, chiefly, to facilitate their manufacture and render them less liable to break or bend when made of light wire; and it consists in forming out of the wire jaws themselves a spiral-spring joint, as will be hereinafter more fully set forth.

Figure 1:
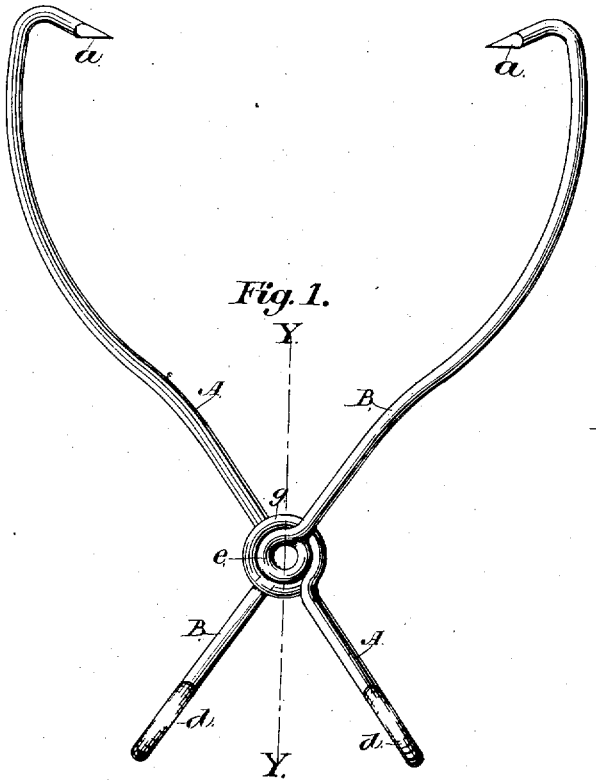
Figure 2:
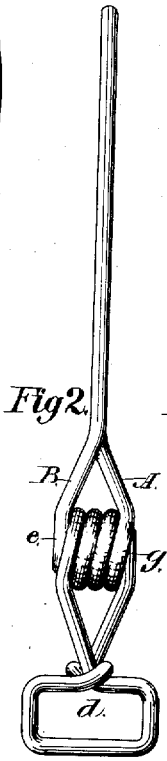
Figure 3:
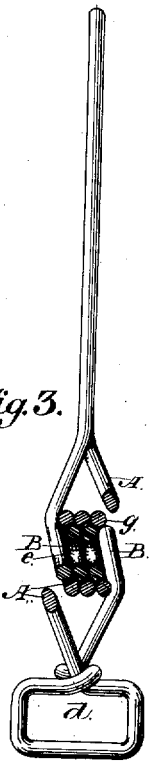
Figure 4:
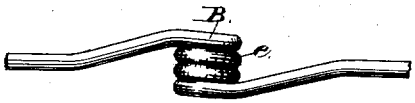

As illustrated in the drawings, Figure 1 is a side elevation of my improved ice-tongs; Fig. 2, an edge view of same; Fig. 3, a section at the line Y Y of Fig. 1; Fig. 4, a detached view of my preferred form of the spiral arbor or pivot-stud of the jaw B; and Figs. 5 and 6 are modified forms of the joints for my improved ice-tongs.

Similar letters refer to similar parts throughout the several views.

As represented in the drawings, A and B are the two jaws of my ice-tongs, made of wire, and provided with hooks *a* and handles *d*, formed out of the wire of said jaws, and made in the usual shape. Said jaws are jointed together by means of a spiral-spring joint, as shown in Figs. 1 and 2, which is the form of joint I preferably use, and which consists of the smaller spiral spring *e*, coiled from the jaw B, as shown in Fig. 4, which coil constitutes the arbor or pivot-stud, and the large spiral spring *g*, coiled from the jaw A, which surrounds the smaller coil *e* of the jaw B, as shown in Figs. 1, 2, and 3, and which forms a socket or sleeve for the arbor *e* to turn in. The coils of the socket *g* lie between the coils of the arbor *e*, similar to the screw-threads of a bolt and nut, so that when said jaws are opened or closed the spiral of the outer coil will follow the spiral of the inner coil, and it may be found necessary to have one or more coils in the arbor *e* than in the socket *g*, to allow for the side or screw movement of the jaw A on the spiral of the jaw B.

Figure 5:
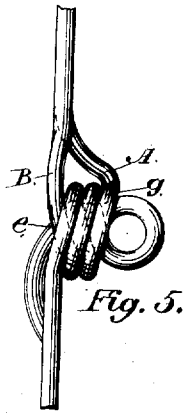
Figure 6:
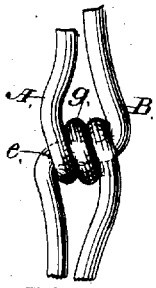

In the modifications shown in Figs. 5 and 6 the constructions only differ in the formation of the pivot-stud or arbor *e*, that shown in Fig. 5 being formed by a twisted loop, and in Fig. 6 by an offset or S formed in the jaw B, instead of the coil shown in Figs. 1, 3, and 4.

Among the advantages claimed for my improved ice-tongs are, first, their simplicity of construction, which facilitates their manufacture; second, the jaws, by being provided wiih a coil-spring at the joint, are less liable to break or bend, and by reason of their elasticity the handles may be brought together without bending or straining the jaws when carrying ice, thereby avoiding the necessity of carrying it by one of the handles, as when made with rigid jaws; and, third, the jaws and joint, by being composed entirely of wire, are open and exposed to the atmosphere, will dry quickly, and be less liable to rust than those composed of a close hub fastened by a rivet or bolt.

My invention is applicable to all kinds of pivoted jaws when made of wire or other material that can be coiled, as herein described.

Having thus described my invention, what I claim is—

1. In ice or other tongs, the jaw B, having the spiral coil *e*, or its equivalent, in combination with the jaw A, having the spiral coil *g*, as herein described, the said coils forming a joint for said jaws, substantially as and for the purpose set forth.

2. The combination, with the jaw A, provided with a spiral coil, *g*, as herein described, of the jaw B, provided with a pivot-stud, *e*, which is formed integrally with said jaw and passes through the coil *g*, so as to form therewith a joint for said jaws, substantially as herein specified.

GILBERT J. DICKSON.

Witnesses:
WM. H. LOW,
S. B. BREWER.